United States Patent
Homma et al.

(10) Patent No.: US 8,633,906 B2
(45) Date of Patent: Jan. 21, 2014

(54) OPERATION CONTROL APPARATUS, OPERATION CONTROL METHOD, AND COMPUTER PROGRAM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 545 days.

(21) Appl. No.: 12/821,431

(22) Filed: Jun. 23, 2010

(65) Prior Publication Data

US 2011/0001694 A1 Jan. 6, 2011

(30) Foreign Application Priority Data

Jul. 3, 2009 (JP) .................................. 2009-159147

(51) Int. Cl.
*G06F 3/041* (2006.01)

(52) U.S. Cl.
USPC ......................................... 345/173

(58) Field of Classification Search
None
See application file for complete search history.

(56) References Cited

U.S. PATENT DOCUMENTS

| | | |
|---|---|---|
| 2007/0097096 A1 | 5/2007 | Rosenberg |
| 2008/0036743 A1 | 2/2008 | Westerman et al. |
| 2008/0136790 A1 | 6/2008 | Hio |
| 2008/0284753 A1 | 11/2008 | Hsu et al. |
| 2009/0150775 A1* | 6/2009 | Miyazaki et al. ............. 715/702 |
| 2009/0167702 A1 | 7/2009 | Nurmi |

FOREIGN PATENT DOCUMENTS

JP 2006-004101 A 1/2006

* cited by examiner

*Primary Examiner* — Adam R Giesy
(74) *Attorney, Agent, or Firm* — Wolf, Greenfield & Sacks, P.C.

(57) ABSTRACT

An operation control apparatus is provided which includes a detection unit for detecting contact of an operation tool with a display surface of a display unit, a contact determination unit for determining a contact state of the operation tool with the display surface based on the detection result by the detection unit, a contact area recognition unit for recognizing, in the case where it is determined by the contact determination unit that the operation tool is in contact with the display surface, a contact area where the operation tool is in contact with the display surface, and an operation determination unit for determining, from a plurality of operation processing associated with an act of the operation tool in contact with the display surface, an operation processing to be executed, based on a size of the contact area recognized by the contact area recognition unit.

7 Claims, 11 Drawing Sheets

TOUCH WITH TIP OF FINGER

PRIOR ART

FIG. 10B

PRIOR ART

OPERATION CONTROL APPARATUS, OPERATION CONTROL METHOD, AND COMPUTER PROGRAM

BACKGROUND OF THE INVENTION

1. Field of the Invention

The present invention relates to an operation control apparatus, an operation control method, and a computer program.

2. Description of the Related Art

Figure 10A:
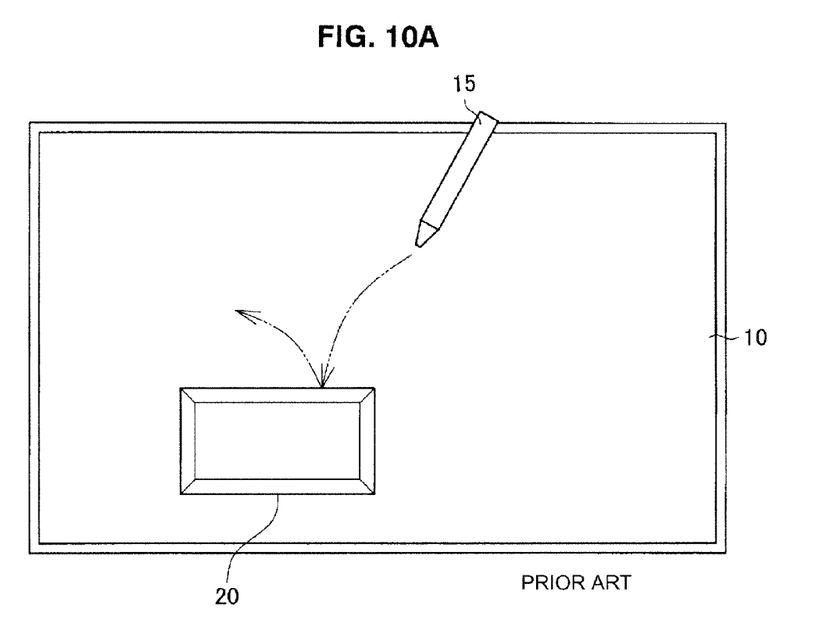
FIG. 10A is an explanatory diagram showing.
Figure 10B:
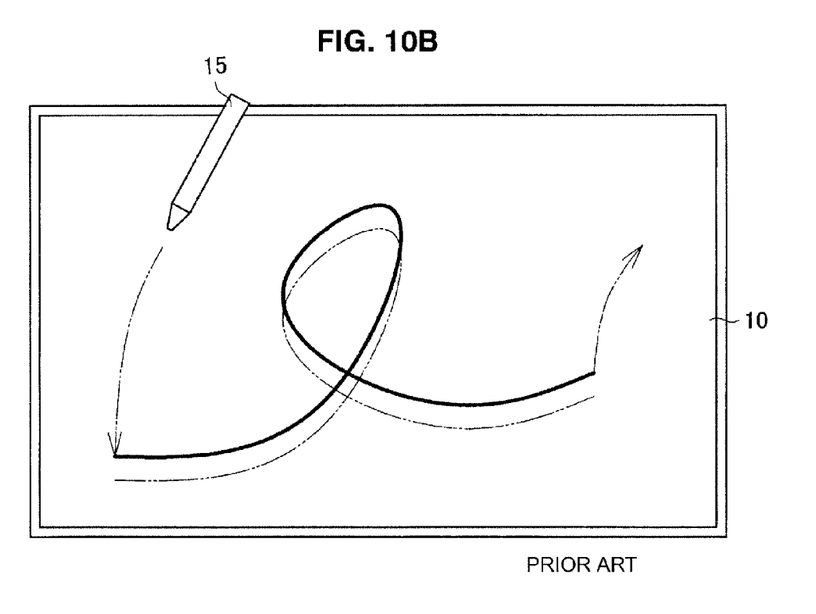
FIG. 10B is an explanatory diagram showing.

In recent years, an UI (User Interface) using a touch panel has been widely used as a means for anyone to be able to easily perform input/output operation of information. According to such UI using a touch panel, for example, as shown in FIG. 10A, when an act of bringing a pen 15 to touch the coordinates where a button 20 exists on a screen 10 is performed, input information of the button 20 being pressed down can be input. Alternatively, as shown in FIG. 10B, a figure can be drawn by using the UI in the screen 10 in the manner that the trajectory of a brushstroke is indicated along the movement of the pen 15, with a position where the pen 15 comes into contact with a display surface as a starting point of the brushstroke and with a position where the pen 15 is released from the display surface as an end point.

With such UI, a user can intuitively perform an operation for screen scroll, which was performed by moving a scroll bar on a UI in a personal computer in the past, by a gesture of directly dragging the screen. However, there was an issue that a selection operation of selecting text or an image and a scroll operation of scrolling the screen were associated with the same gesture, and the operations conflicted.

There can be considered a solution to such problem, that a new gesture for performing the selection operation is taught and set, which, however, becomes a cause of lowering operability. Accordingly, for example, in JP-A-2006-4101, a method of switching, per application, interaction by a drag operation is proposed.

SUMMARY OF THE INVENTION

However, in the multiplexed state in which a plurality of processing is associated with a drag operation within an application, it is difficult to dynamically separate these processing. For example, in the case of simultaneously performing the screen scroll operation and the text selection processing in a web browser, it is difficult to dynamically separate the screen scroll operation and the selection operation without causing a user to learn a new operation. Moreover, although the operation desired to be performed by a drag operation is clear for the user, the operation processing contrary to the user's intention may be executed.

In light of the foregoing, it is desirable to provide an operation control apparatus and an operation control method which are novel and improved, and which are capable of accurately presuming the operation intended by the user and of determining processing to be executed.

According to an embodiment of the present invention, there is provided an operation control apparatus including a detection unit for detecting contact of an operation tool with a display surface of a display unit, a contact determination unit for determining a contact state of the operation tool with the display surface based on the detection result by the detection unit, a contact area recognition unit for recognizing, in the case that it is determined by the contact determination unit that the operation tool is in contact with the display surface, a contact area where the operation tool is in contact with the display surface, and an operation determination unit for determining, from a plurality of operation processing associated with an act of the operation tool in contact with the display surface, an operation processing to be executed, based on a size of the contact area recognized by the contact area recognition unit.

According to the present invention, the operation processing to be executed is determined from the plurality of operation processing associated with the act of the operation tool, based on the size of the contact area of the operation tool with the display surface. This enables the operation control apparatus to accurately presume the operation intended by the user from the size of the contact area of the operation tool and to determine the processing to be executed. Moreover, the user can cause the desired operation processing to be executed only by performing the same act by changing the size of the contact area of the operation tool, without learning a new operation.

Here, an act of moving the operation tool while keeping the operation tool in contact with the display surface may be associated with scroll processing for scrolling a screen displayed on the display unit and with cursor movement processing for moving a cursor indicating a display position on the display unit. At this time, the operation determination unit may determine an execution of the scroll processing in the case where the size of the contact area is less than a size threshold value for determining the operation processing and the operation determination unit may determine an execution of the cursor movement processing in the case where the size of the contact area is equal to or greater than the size threshold value.

Moreover, the operation control apparatus of the present invention may further include a speed calculation unit for calculating a moving speed of the operation tool based on the detection result by the detection unit. The operation control unit may cause the cursor movement processing to be executed even if the size of the contact area is smaller than the size threshold value, in the case where the moving speed of the operation tool becomes greater than a predetermined speed.

Furthermore, the operation determination unit, in the case of determining the execution of the scroll processing, may execute the scroll processing until the operation tool is released from the display surface.

The size of the contact area may be an area of the contact area.

According to another embodiment of the present invention, there is provided an operation control method, including the steps of detecting contact of an operation tool with a display surface of a display unit, determining a contact state of the operation tool with the display surface based on the detection result, recognizing, in the case where it is determined that the operation tool is in contact with the display surface, a contact area where the operation tool is in contact with the display surface, and determining, from a plurality of operation processing associated with an act of the operation tool in contact with the display surface, an operation processing to be executed, based on a size of the recognized contact area.

According to another embodiment of the present invention, there is provided a computer program for causing a computer to function as the operation control apparatus described above. The computer program is stored in a storage device included in the computer, and it is read and executed by a CPU included in the computer, thereby causing the computer to function as the display control apparatus described above. Moreover, there is also provided a computer readable recording medium in which the computer program is stored. The recording medium may be a magnetic disk or an optical disk, for example.

According to the embodiments of the present invention described above, there can be provided the operation control apparatus and the operation control method, capable of accurately presuming the operation intended by the user and of determining the processing to be executed.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Outline of control by operation control apparatus
2. Configuration of operation control apparatus
3. Operation control method by operation control apparatus <1. Outline of Control by Operation Control Apparatus>

Figure 1A:
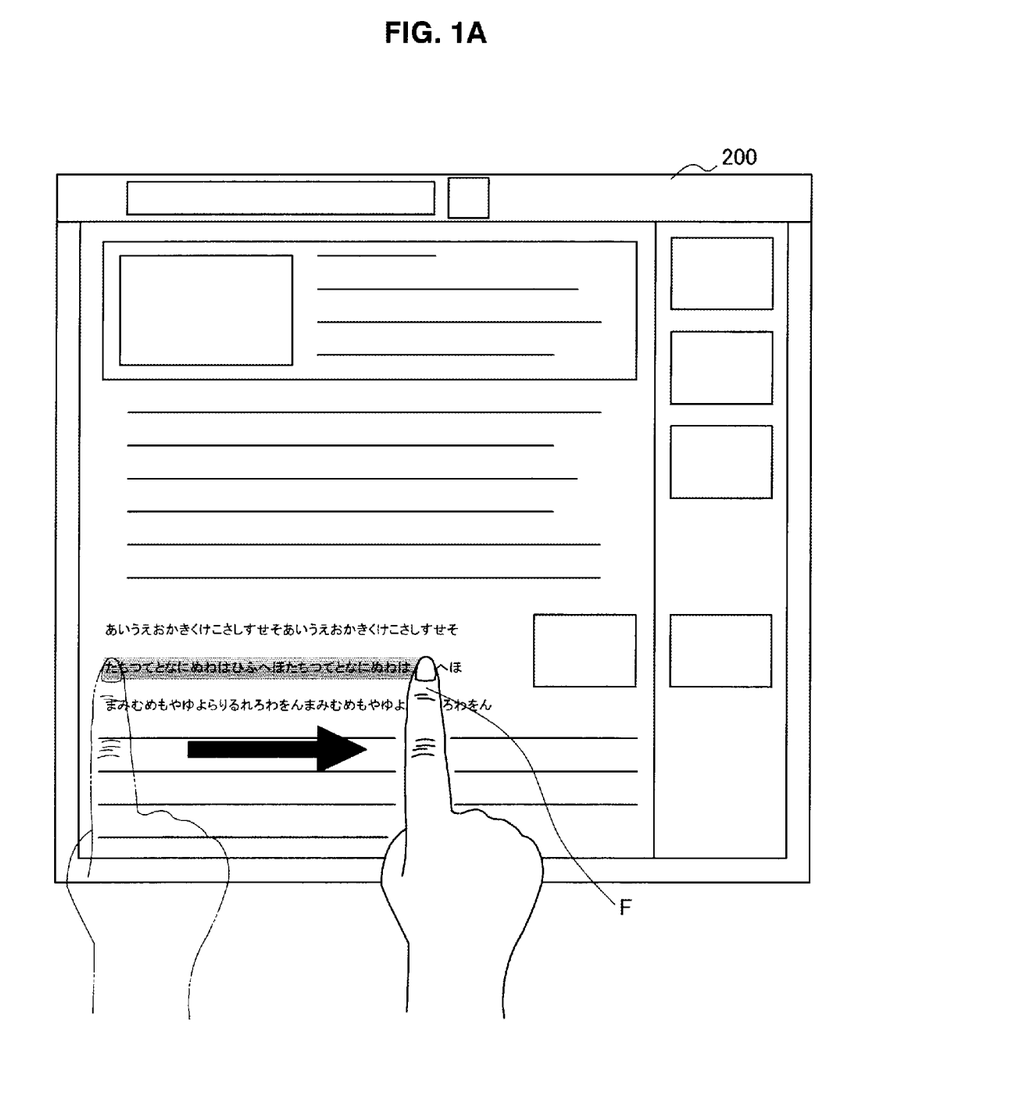
FIG. 1A is an explanatory diagram showing a situation in which text selection processing is performed.
Figure 1B:
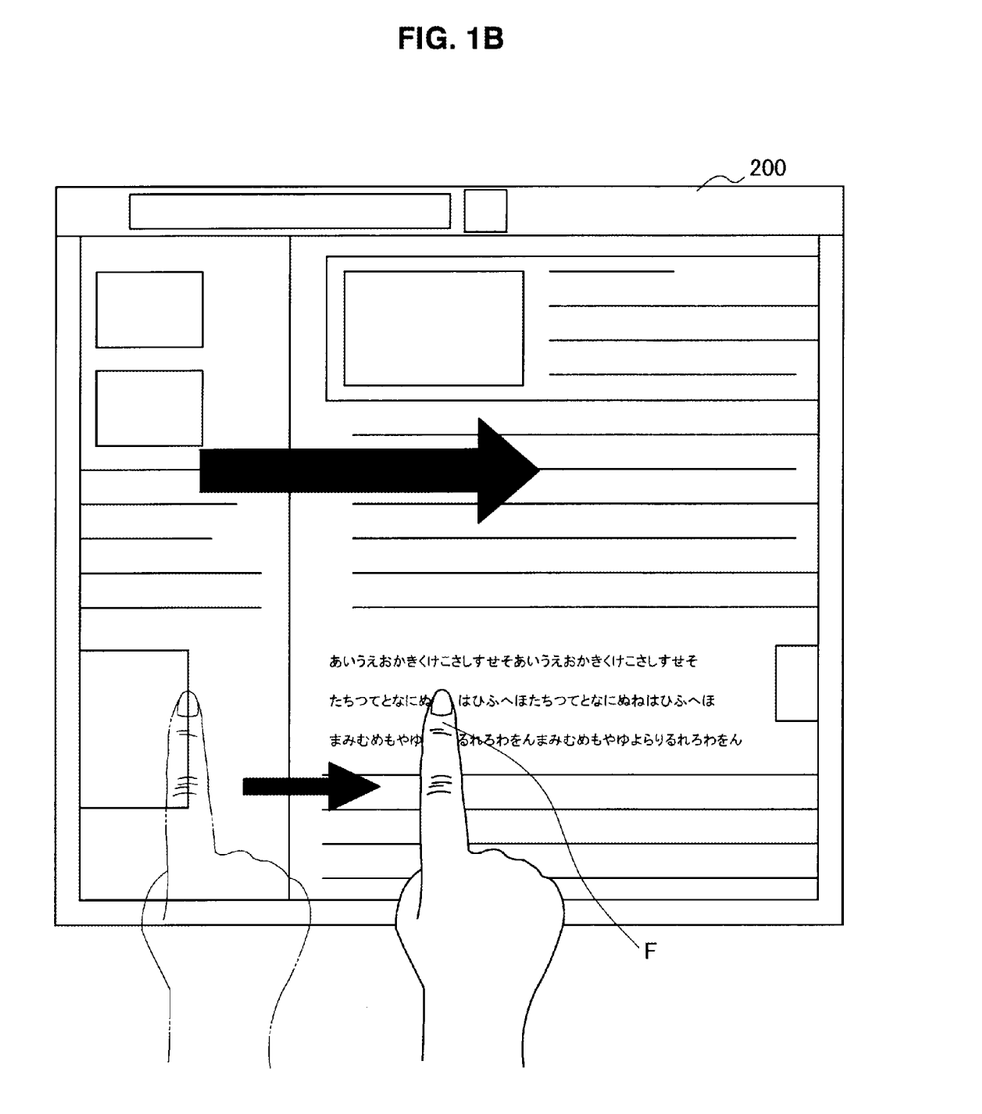
FIG. 1B is an explanatory diagram showing a situation in which screen scroll processing is performed.

First, an outline of a control by an operation control apparatus according to an embodiment of the present invention will be described based on FIG. 1A and FIG. 1B. In addition, FIG. 1A is an explanatory diagram showing a situation in which text selection processing is performed. FIG. 1B is an explanatory diagram showing a situation in which screen scroll processing is performed.

In the present embodiment, there is assumed the system having the so-called GUI function, for example, to perform an application operation by a coordinate input by touching a touch panel device integrally configured with a display unit, with an operation tool such as a finger or a stylus. Such a system can be applied to a public terminal or a business terminal which uses a laptop computer that allow a touch input with a finger, for example.

In the present embodiment, for example, as shown in FIG. 1 and FIG. 1B, there is assumed the operation of a screen 200 on which an object such as text is arranged on a scrollable page such as a general web page. An input cursor (e.g., caret) indicating an input position of a character or the like is displayed on the text. There is possible an operation supported by a general GUI of a computer such as specifying a starting point or an ending point of the text by the input cursor or selecting the text.

A characteristic of the operation control apparatus according to the present embodiment is that even if the same drag operation is performed on the same screen, different interaction is performed according to the stroke speed of the drag operation by a user or the contact area of the operation tool. In the present embodiment, text selection processing for selecting text which is an example of the object and screen scroll processing for scrolling the screen is associated with the drag operation on the screen, and one of the processing is executed depending on a condition.

For example, in the case where it is determined by the operation control apparatus to execute the text selection processing from the stroke speed of the drag operation by the user or the contact area of the operation tool, the text displayed on the screen 200 is selected along the movement of a finger F which is the operation tool, as shown in FIG. 1A. Moreover, it is determined by the operation control apparatus to execute the screen scroll processing from the stroke speed of the drag operation by the user or the contact area of the operation tool, the whole screen 200 is scrolled along the movement of the finger F, as shown in FIG. 1B.

In this manner, the operation control apparatus according to the present embodiment provides a means of presuming the operation intended by the user, from the stroke speed of the drag operation by the user or the contact area of the operation tool and of dynamically switching the text selection processing and the screen scroll processing. In the following, the operation control apparatus according to the present embodiment and the control method by the operation control apparatus will be described in detail.

<2. Configuration of Operation Control Apparatus>

[Hardware Configuration]

First, a hardware configuration of an operation control apparatus 100 according to the present embodiment will be described based on FIG. 2. In addition, FIG. 2 is a block diagram showing the hardware configuration of the operation control apparatus 100 according to the present embodiment.

Figure 2:
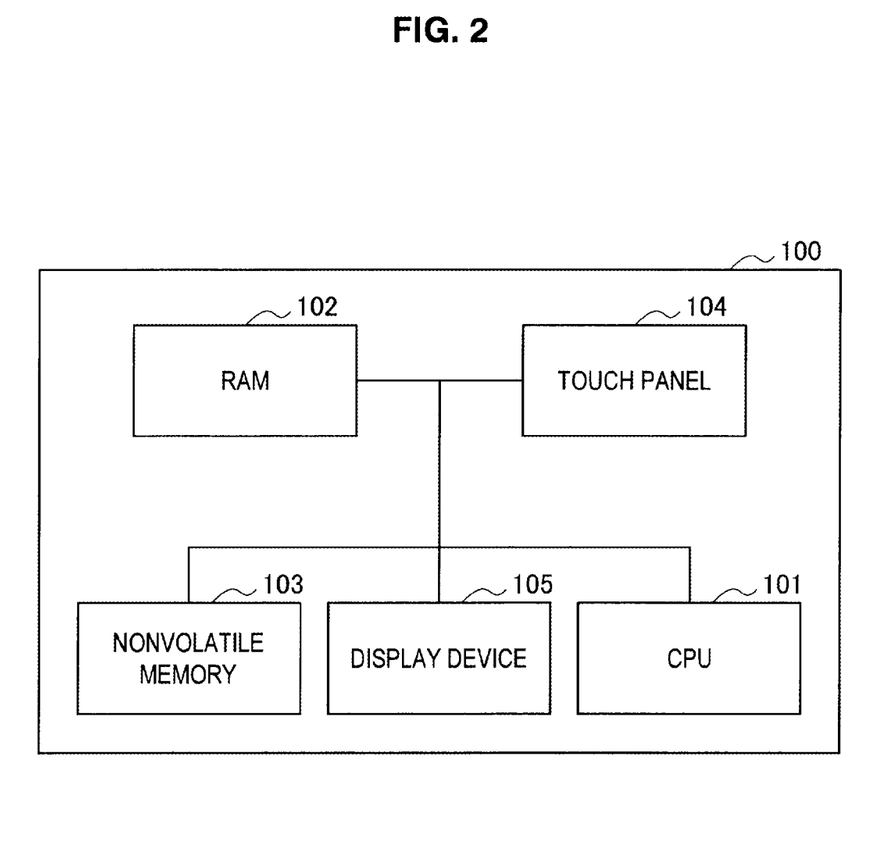
FIG. 2 is a block diagram showing a hardware configuration of an operation control apparatus according to an embodiment of the present invention.

The operation control apparatus 100 according to the present embodiment includes a CPU (Central Processing Unit) 101, a RAM (Random Access Memory) 102, and a nonvolatile memory 103, as shown in FIG. 2. Furthermore the operation control apparatus 100 includes a touch panel 104 and a display device 105.

The CPU 101 functions as an arithmetic processing device and a control device and controls the overall operations within the operation control apparatus 100 according to a variety of programs. Moreover, the CPU 101 may be a microprocessor. The RAM 102 temporarily stores therein programs used in the execution of the CPU 101 and parameters that change appropriately in the execution, and the like. These are interconnected via a host bus including a CPU bus and the like. The nonvolatile memory 103 stores therein programs, calculation parameters and the like used by the CPU 101. The nonvolatile memory 103 may be a ROM (Read Only Memory) or a flash memory, for example.

The touch panel 104 is an example of an input device for a user to input information and includes an input means for inputting information and an input control circuit for generating an input signal based on input by the user and for outputting the input signal to the CPU 101. The user can input various types of data into, and give an instruction for processing operation to the operation control apparatus 100 by operating the touch panel 104. The display device 105 is an example of an output device for outputting information. The display device 105 may be a CRT (Cathode Ray Tube) display device, a liquid crystal display (LCD) device, or an OLED (Organic Light Emitting Diode) device, for example.

[Functional Configuration]

Figure 3:
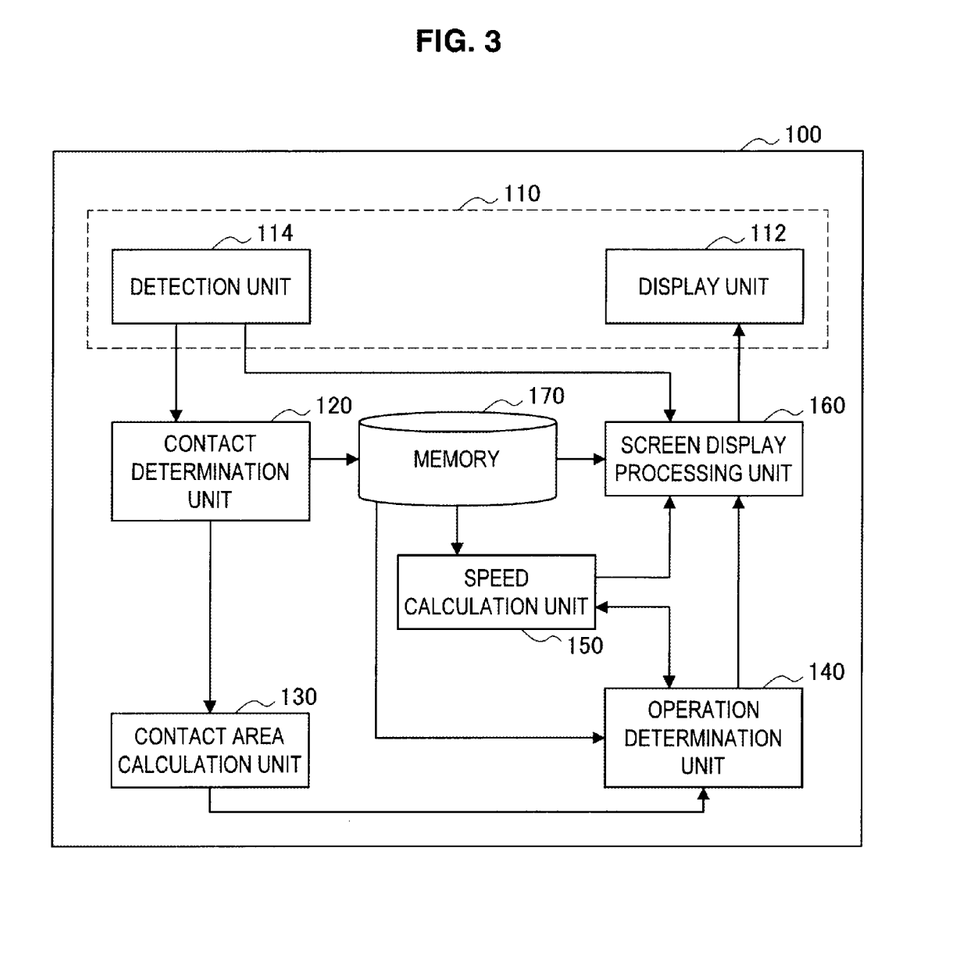
FIG. 3 is a functional block diagram showing a functional configuration of the operation control apparatus according to the embodiment.
Figure 4:
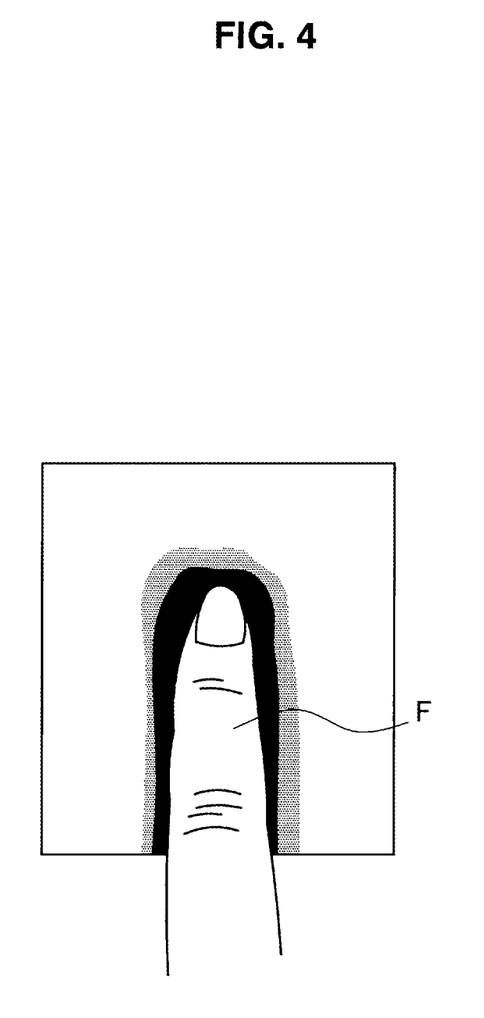
FIG. 4 is an explanatory diagram showing a distribution of capacitance detected by a capacitive touch sensor.

Next, a functional configuration of the operation control apparatus 100 according to the present embodiment will be described based on FIG. 3 and FIG. 4. In addition, FIG. 3 is a functional block diagram showing the functional configuration of the operation control apparatus 100 according to the present embodiment. FIG. 4 is an explanatory diagram showing a distribution of capacitance detected by a capacitive touch sensor.

The operation control apparatus 100 according to the present embodiment includes a display/input unit 110, a contact determination unit 120, a contact area calculation unit 130, an operation determination unit 140, a speed calculation unit 150, a screen display processing unit 160, and a memory 170, as shown in FIG. 3.

The display/input unit 110 is a device which displays an object such as text, an icon, or a graphic, and which is capable of operating a cursor or the object within a screen that are displayed, by an operation tool touching them. The operation tool for manipulating the cursor or the like displayed on the display unit 100 may be a finger or a stylus, for example. The display/input unit 110 includes a display unit 112 for displaying the object, and a detection unit 114 for detecting proximity and contact of the operation tool with a display surface of the display device 112. The display unit 112 corresponds to the display device 105 in FIG. 2 and may be a liquid crystal display or an organic EL display, for example. Moreover, the detection unit 114 corresponds to the touch panel 104 in FIG. 2 and may be a sensor for detecting a change in capacitance, a sensor for detecting a change in pressure on the display unit 112, or an optical sensor for detecting proximity of the operation tool by detecting a change in the amount of light (darkness of a shadow), for example.

For example, in the case where the detection unit 114 is a capacitive touch panel for detecting a change in capacitance, the touch panel can be configured by arranging capacitive sensors in a matrix form (e.g., 10×6). The touch panel constantly changes the output value of the touch panel according to a change in distance between the touch panel and an object to be detected. When a finger comes close to or touches the capacitive sensor, the capacitance detected by the capacitive sensor increases. Interaction such as tapping can be detected based on a change in the increase of the capacitance detected by the capacitive sensor. Moreover, capacitance of each of the capacitive sensors can be obtained at the same time. Accordingly, as described later, the form of the operation tool (e.g., finger F) which approaches or touches the touch panel can be obtained by detecting the changes in capacitance of all the capacitive sensors at the same time by the detection unit 114 and by interpolating the detected values. In addition, it is enough for the detection unit 114 according to the present embodiment to detect at least contact of the operation tool with the display/input unit 110.

The detection unit 114 outputs the detected detection values, as a detection result, to the contact determination unit 120 and the screen display processing unit 160. In addition, in the case where the detection unit 114 is provided to the object display surface side of the display unit 112, the user operates the cursor such as a caret displayed on the display unit 112 by bringing the operation tool in contact with the detection unit 114. At this time, it is the surface of the detection unit 114 that the operation tool actually touches, but in the following, description will be made, taking a surface with which the operation tool is brought into contact in this manner as "display surface (of the display/input unit 110)".

The contact determination unit 120 determines whether the operation tool has come into contact with the display surface of the display/input unit 110. For example, in the case where the detection unit 114 is a capacitive touch panel for detecting a change in capacitance, the contact determination unit 120 determines whether the operation tool has come into contact with the display surface of the display/input unit 110, based on the capacitance values detected by the detection unit 114. By the use of the capacitive touch panel, there can be recognized the size of the capacitance which changes according to contact or proximity of the operation tool with the display surface, as shown in FIG. 4. In FIG. 4, an area indicated in black is a contact area where the finger F is in contact with the touch panel and where the capacitance is high. On the other hand, an area indicated in white is an area where there is no finger on the touch panel and where the capacitance is low.

In this manner, whether the operation tool is in contact with the touch panel is determined by the size of the capacitance detected by the touch panel. In the case where the contact determination unit 120 determines that the operation tool is in contact with the touch panel, the contact determination unit 120 outputs imaged information about the contact area to the contact area calculation unit 130. Moreover, the contact determination unit 120 associates at least the detection time when the detection unit 114 detected the capacitance and the position of the center of gravity of the operation tool at the detection time and stores them in the memory 170.

The contact area calculation unit 130 calculates the area of the contact area where the operation tool is in contact with the display surface of the display/input unit 110. That is, the contact area calculation unit 130 functions as a contact area recognition unit for recognizing the contact area, which obtains information about the contact area and calculates the contact area. In the present embodiment, the area of the contact area is used as an indicator of the size of the contact area. When the image indicating the contact area is input from the contact determination unit 120, the contact area calculation unit 130 starts calculation processing of the area of the contact area. Then, the contact area calculation unit 130 outputs the calculated value of the contact area to the operation determination unit 140.

The operation determination unit 140 determines processing to be executed, based on the area of the contact area of the operation tool or the stroke speed of the operation tool. For example, in the case where a drag operation is associated with text selection processing and screen scroll processing, the operation determination unit 140 determines which processing to perform, based on the area of the contact area of the operation tool or the stroke speed of the operation tool. In order to make the determination, the operation determination unit 140 causes the speed calculation unit 150 to calculate the stroke speed or the stroke acceleration of the operation tool and receives the calculation result. When having determined the processing to be executed, the operation determination unit 140 instructs the screen display processing unit 160 to execute the determined processing.

The speed calculation unit 150 calculates the stroke speed and the stroke acceleration of the operation tool moving on the display screen. When having received the speed calculation instruction from the operation determination unit 140, the speed calculation unit 150 calculates the stroke speed and the stroke acceleration of the operation tool based on the positions of the operation tool at a plurality of time points in the past and their time information stored in the memory 170. Then, the speed calculation unit 150 outputs the calculation result to the operation determination unit 140 and the screen display processing unit 160.

The screen display processing unit 160 executes the processing determined by the operation determination unit 140 and changes the display content of the display unit 112 based on the processing result. For example, in the case where it is determined by the operation determination unit 140 from the drag operation performed on the screen to execute the text selection processing, the screen display processing unit 160 moves the cursor based on the detection result by the detection unit 114 or the positional information of the operation tool at the plurality of time points in the past recorded in the memory 170. Moreover, in the case where it is determined by the operation determination unit 140 from the drag operation performed on the screen to execute the screen scroll processing, the screen display processing unit 160 scrolls the screen based on the detection result by the detection unit 114 or the positional information of the operation tool at the plurality of time points in the past recorded in the memory 170. The screen display processing unit 160 can also perform the display processing using the stroke speed or the stroke acceleration of the operation tool calculated by the speed calculation unit 150 as necessary. The display information processed by the screen display processing unit 160 is output to the display unit 112 and the display content of the display unit 112 is changed.

The memory 170 associates the positions of the operation tool on the screen at the plurality of time points with their time information, and stores them therein. The memory 170 associates the position of the center of gravity of the operation tool calculated from the detection result by the detection unit 114 with the detection time, and stores them therein. Moreover, there is stored in the memory 170 a threshold value related to the size of the contact area of the operation tool and used for determining the processing to be executed from the text selection processing and the screen scroll processing.

Figure 5:
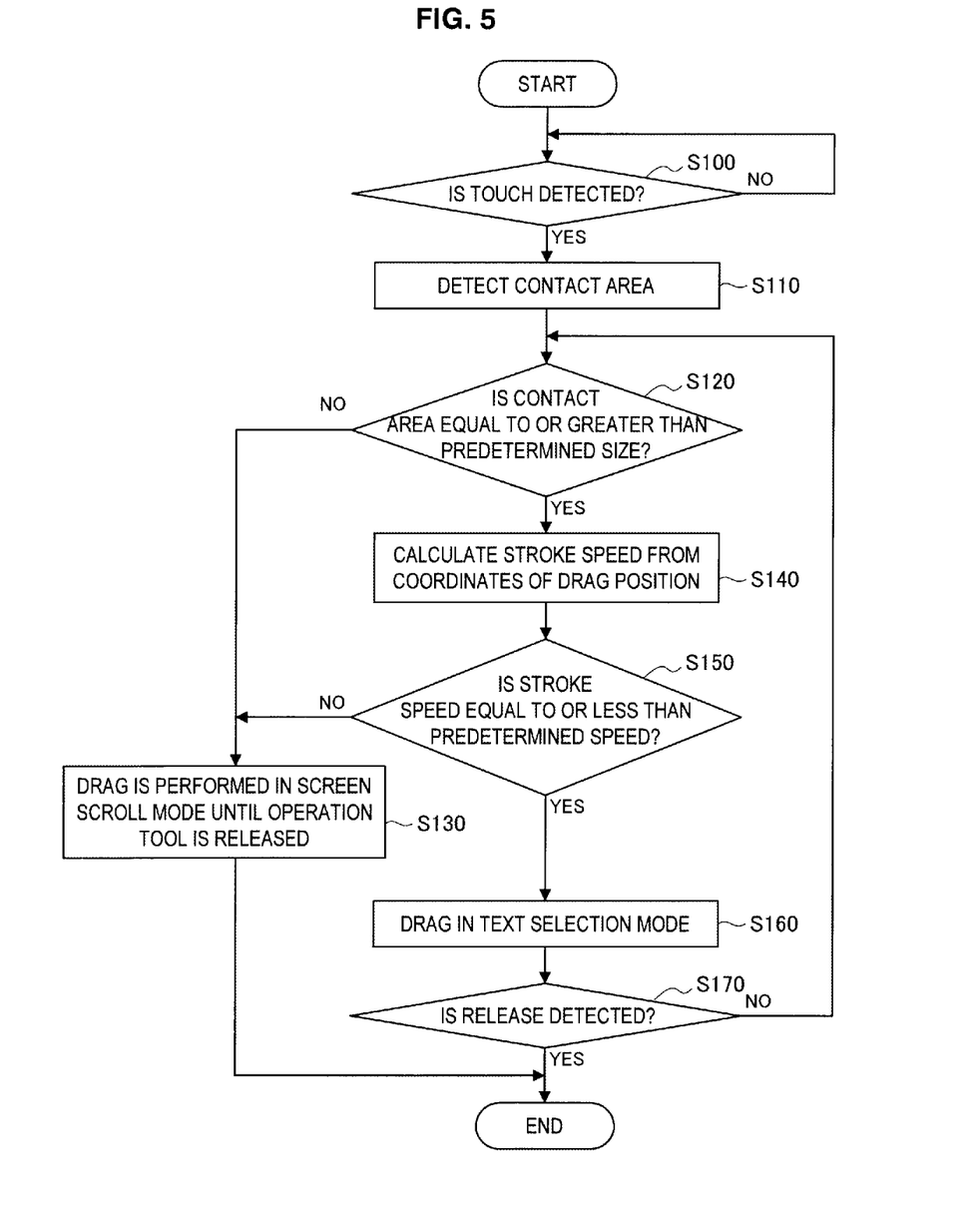
FIG. 5 is a flowchart showing an operation control method according to the embodiment.
Figure 6:
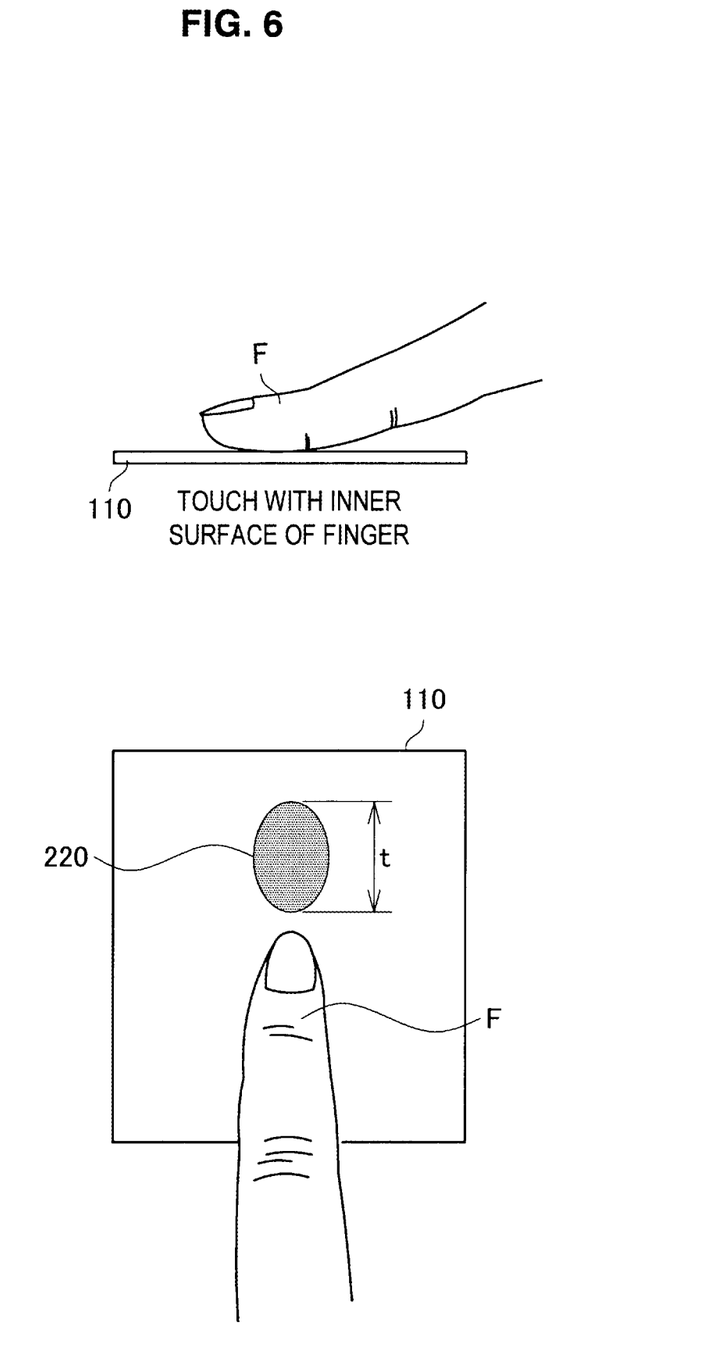
FIG. 6 is an explanatory diagram showing a contact state of a finger and the size of the contact area at the time of touching a screen with the inner surface of the finger.
Figure 7:
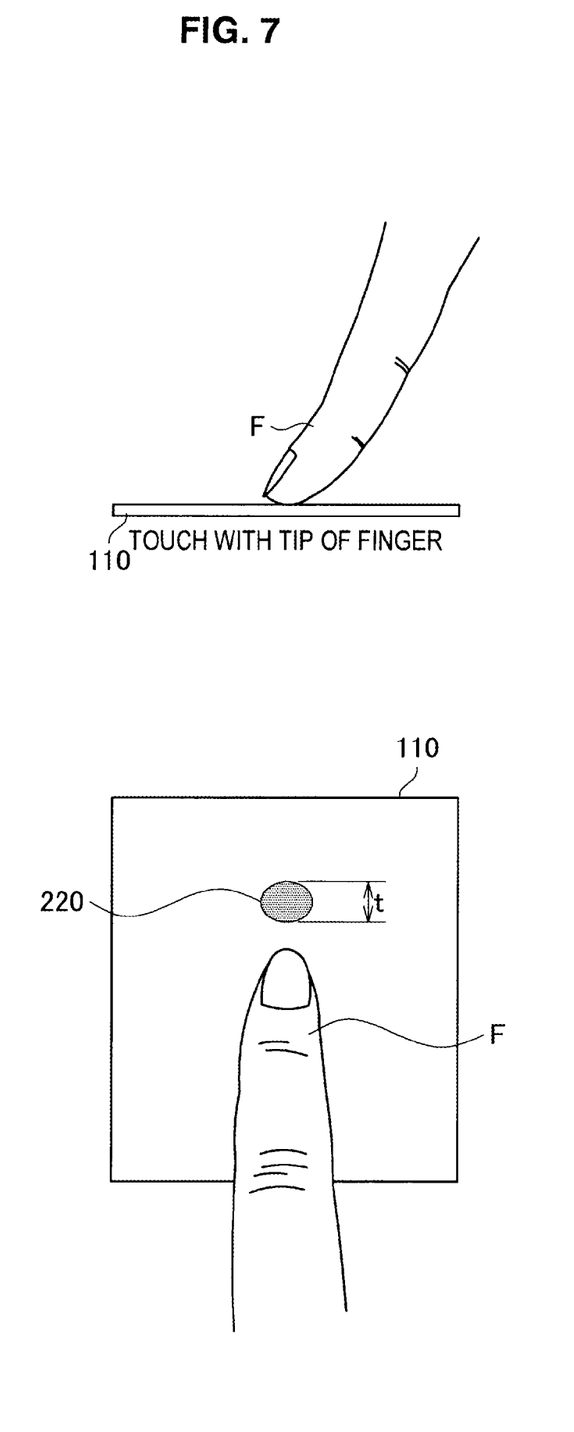
FIG. 7 is an explanatory diagram showing a contact state of the finger and the size of the contact area at the time of touching the screen with the tip of the finger.
Figure 8:
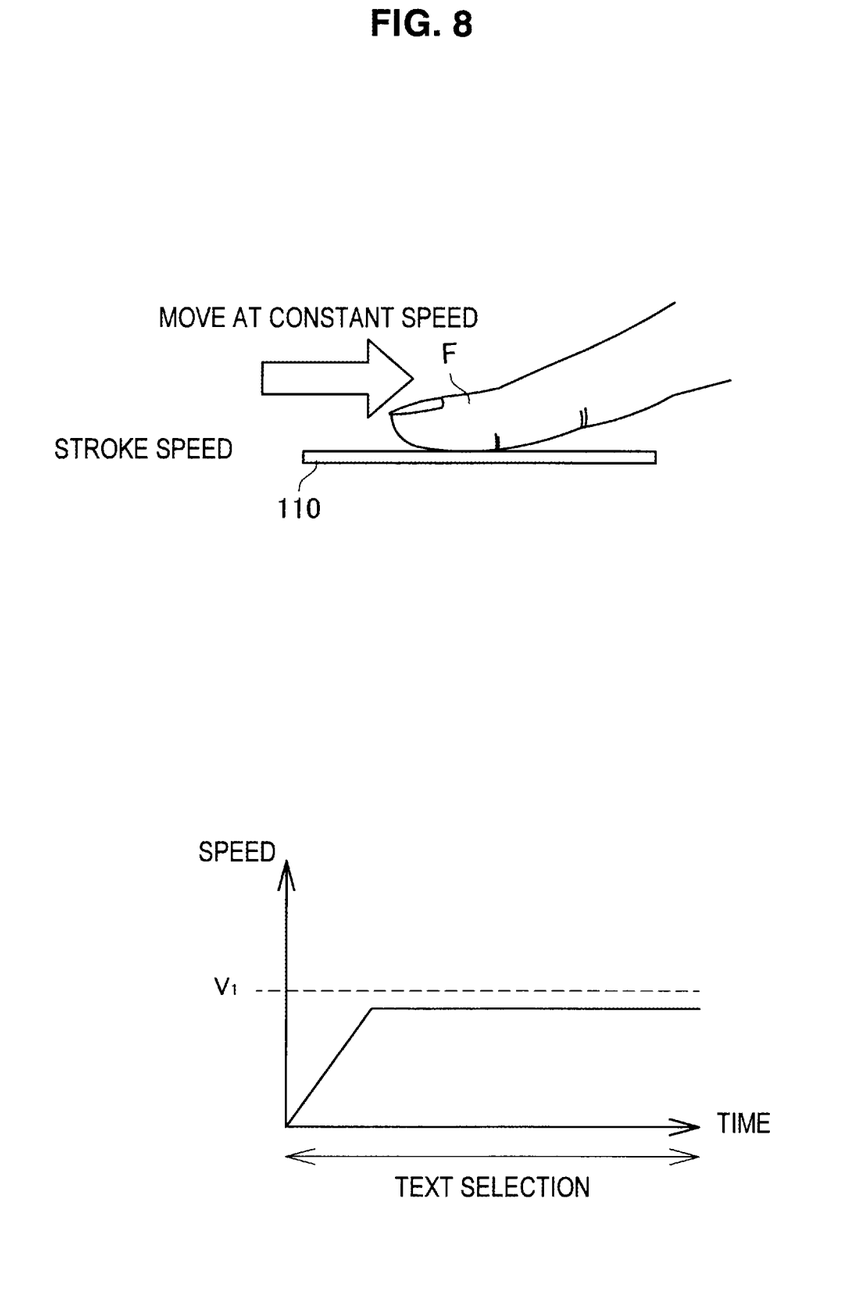
FIG. 8 is an explanatory diagram showing a change of speed of an operation tool when a stroke speed of a drag operation is constant.
Figure 9:
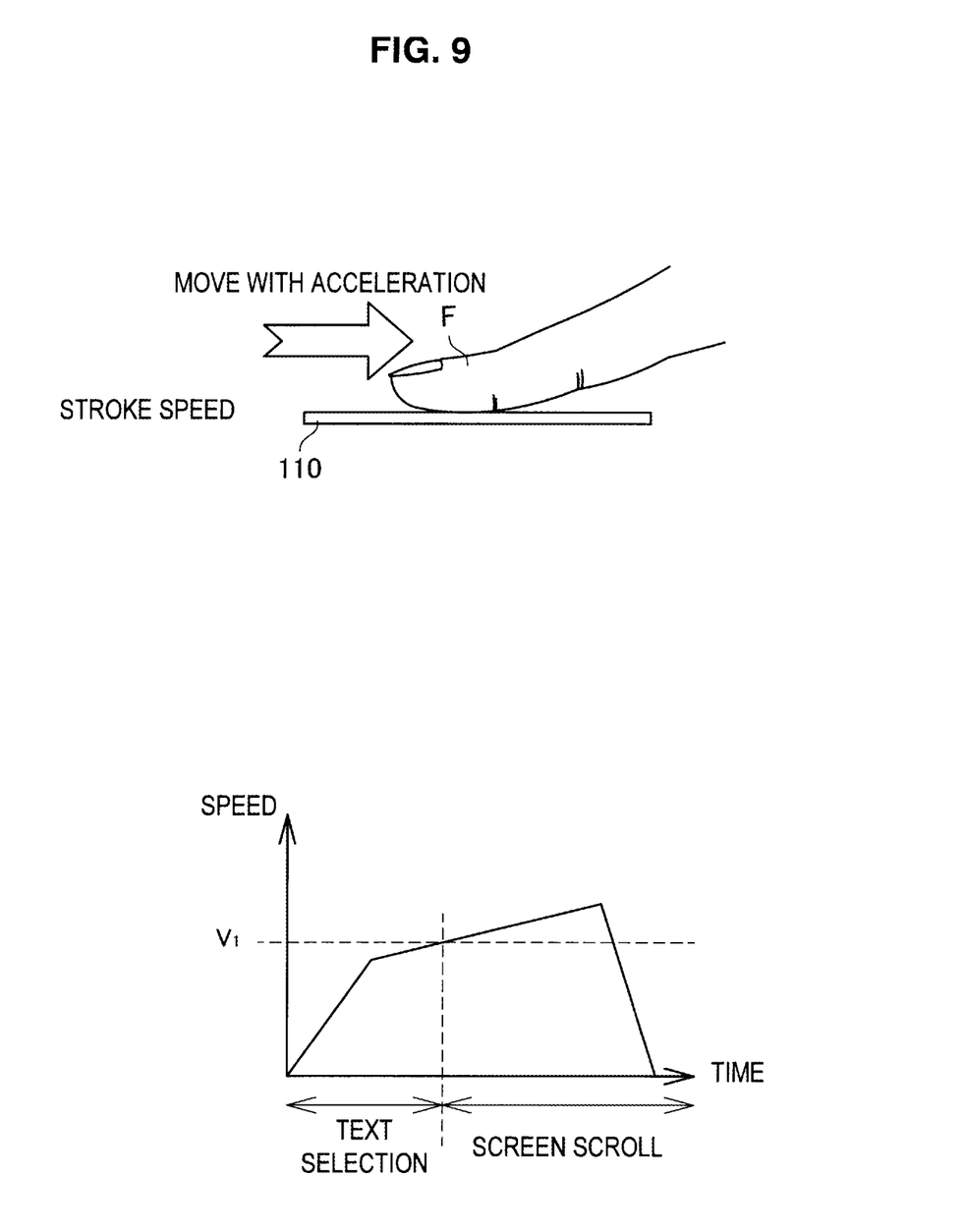
FIG. 9 is an explanatory diagram showing a change of speed of the operation tool when a stroke speed of a drag operation is increasing.

The configuration of the operation control apparatus 100 according to the present embodiment has been described above. Next, an operation control method by the operation control apparatus 100 according to the present embodiment will be described based on FIG. 5 to FIG. 9. FIG. 5 is a flowchart showing the operation control method according to the present embodiment. FIG. 6 is an explanatory diagram showing a contact state of a finger and the size of the contact area at the time of touching the screen with the inner surface of the finger. FIG. 7 is an explanatory diagram showing a contact state of the finger and the size of the contact area at the time of touching the screen with the tip of the finger. FIG. 8 is an explanatory diagram showing a change of speed of an operation tool when a stroke speed of a drag operation is constant. FIG. 9 is an explanatory diagram showing a change of speed of the operation tool when a stroke speed of a drag operation is increasing.

<3. Operation Control Method by Operation Control Apparatus>

In the operation control method by the operation control apparatus 100 according to the embodiment of the present invention, as shown in FIG. 5, the contact determination unit 120 first determines whether the operation tool has come into contact with the display surface of the display/input unit 110 (step S100). As described above, the contact determination unit 120 can determine whether the operation tool is in contact with the display surface of the display/input unit 110 based on the detection result of the detection unit 114. For example, there is assumed the case where the detection unit 114 is a capacitive touch panel. At this time, the contact determination unit 120 determines that a finger F has come into contact with the display/input unit 110 when the detected capacitance increases by a predetermined value or more from the detection values of the capacitive sensors at the time when the finger F is not in contact with the display surface of the display/input unit 110. The contact determination unit 120 repeats the processing of the step S100 until it determines that the finger F has come into contact with the display surface of the display/input unit 110.

When having determined that the finger F has come into contact with the display surface of the display/input unit 110, the contact determination unit 120 causes the contact area calculation unit 130 to calculate the area of the contact area where the finger F is in contact with the display surface (step S110). At the present step, the area of the contact area used as an indicator of the size of the contact area is calculated. The contact area calculation unit 130 recognizes the form of the contact area where the finger F is in contact with the display surface of the display/input unit 110 as an image, from the change of the capacitance which is the detection result of the detection unit 114. Then, the contact area calculation unit 130 calculates the area of the contact area as the size of the contact area from the recognized image. In the calculation of the area of the contact area, first, the pixels are binarized, by setting a pixel whose capacitance is greater than a predetermined threshold value to 1 and a pixel whose capacitance is equal to or less than the predetermined threshold value to 0. Then, the number of pixels exceeding the predetermined threshold value (namely, pixels of "1") is calculated from the binarized image and the calculated number is multiplied by the area per pixel, and thereby the area of the contact area can be calculated.

Next, the contact area calculation unit 130 determines whether the calculated area of the contact area is equal to or greater than a predetermined size (S120). In the present embodiment, in the case where the same drag operation is performed, whether the area of the contact area is equal to or greater than a predetermined size is used as a judging factor for clearly distinguishing between the screen scroll and the text selection intended by a user. For example, as shown in FIG. 6, in the case where the inner surface of the finger F is in contact with the display/input unit 110, the form of the contact mark 220 is a substantially elliptical shape extending in a longitudinal direction of the finger, and the area of the contact mark 220 is large. On the other hand, as shown in FIG. 7, in the case where the tip of the finger F is in contact with the display/input unit 110, the form of the contact mark 220 is a substantially elliptical shape having the small area and extending in a width direction of the finger.

In this manner, the area of the contact area 220 changes depending on the way the finger F touches the display surface. By using this, for example, in the case of performing the text selection, it is often the case that the inner surface of the finger F is brought into contact with the display surface and the contact area is equal to or greater than the predetermined size, so that in the case where the area of the contact area is equal to or greater than a predetermined area, the operation determination unit 140 causes the text selection processing to be executed. On the other hand, in the case of scrolling the screen, it is often the case that a drag is performed in the manner that the tip of the finger F is brought into slight contact with the display surface and is moved. Accordingly, in the case where the tip of the finger F is in contact with the display surface and the contact area is less than the predetermined area, the operation determination unit 140 causes the screen scroll processing to be executed. Here, the predetermined area which is a size threshold value may be preliminarily set or may be calibrated to each user and set to an intermediate value between the area of the contact area when the inner surface of the finger F is brought into contact and the area of the contact area when the tip of the finger F is brought into contact, for example.

In addition, to dynamically change interaction according to the increase or decrease of the area of the contact area makes operation processing complex and makes operation difficult. Accordingly, in the present embodiment, to eliminate such complexity, it is possible to cause the processing frequently executed by a drag operation to be preferentially executed. For example, the frequency that the screen scroll processing is executed by the drag operation is generally higher than the frequency that the text selection processing is executed. Accordingly, in the case where the area of the contact area of the operation tool with the display surface is equal to or greater than the predetermined area and becomes less than the predetermined area afterward, the operation determination unit 140 causes the screen scroll processing to be executed, but the vice versa does not hold. That is, the operation determination unit 140 does not cause the text selection processing to be executed even if the area of the contact area becomes equal to or greater than the predetermined area from the state of less than the predetermined area. In this manner, by causing the frequently-executed screen scroll processing to be executed in preference to the text selection processing, the complexity of the operation processing can be eliminated.

Returning to FIG. 5, in the case where it is determined at the step S120 that the area of the contact area is equal to or greater than the predetermined size, the operation determination unit 140 determines the execution of the screen scroll processing (step S130). The operation determination unit 140 outputs to the screen display processing unit 160 an instruction to execute the screen scroll processing by a drag operation by the operation tool. Then, the screen display processing unit 160 recognizes the movement of the position of the center of gravity of the operation tool from the detection result of the operation unit 114 and scrolls the screen in the moving direction of the position of the center of gravity. When the operation tool is released from the display surface, the operation control apparatus 100 terminates the operation control.

On the other hand, it is determined at the step S120 that the area of the contact area is greater than the predetermined size, the operation determination unit 140 causes the speed calculation unit 150 to calculate the stroke speed of the operation tool (step S140). The speed calculation unit 150 refers to the memory 170 and calculates the stroke speed of the operation tool based on the plurality of time points in the past and their time information.

Subsequently, the operation determination unit 140 determines whether the stroke speed of the operation tool calculated by the speed calculation unit 150 is equal to or less than a predetermined speed (step S150). With the operation control method according to the present embodiment, the interaction in the drag operation can be switched according to the stroke speed of the operation tool at the time of the drag operation. Here, as shown in FIG. 8, in the case where the moving speed of the drag operation is constant, the stroke speed increases at the beginning but becomes a certain constant speed afterward. On the other hand, in the case where the stroke speed continues to increase, the stroke speed changes as a steadily increasing graph as shown in FIG. 9.

In the case where it is determined at the step S150 that the stroke speed is equal to or less than the predetermined speed, the operation determination unit 140 causes the text selection processing to be executed (step S160). Generally, since the text selection is performed while confirming the display content in detail, the stroke speed at the time of the text selection is slower than the stroke speed at the time of the screen scroll. Accordingly, in the case where the stroke speed is equal to or less than the predetermined speed $V_1$, the text selection processing is executed. For example, the operation determination unit 140 causes the text selection processing to be executed in the case where the operation tool is moved at a constant stroke speed equal to or less than the speed $V_1$ as shown in FIG. 8 or unless the stroke speed exceeds the speed $V_1$ as shown in FIG. 9.

Then, the contact determination unit 120 determines whether the operation tool has been released from the display surface (step S170), and in the case where it is determined that the operation tool has been released, the operation control apparatus 100 terminate the operation control. On the other hand, in the case where it is determined that the operation tool is kept in contact with the display surface, the processing from the step S120 is repeated.

Moreover, in the case where it is determined at the step S150 that the stroke speed is greater than the predetermined speed $V_1$, the processing proceeds to the step S130 the operation determination unit 140 and the operation determination unit 140 determines the execution of the screen scroll processing. In addition, as described above, in the present embodiment, the screen scroll processing is performed in preference to the text selection processing in the drag operation in order to improve operability. Consequently, once the stroke speed exceeds the speed $V_1$ and the processing is switched to the screen scroll processing, the processing won't be further switched to the text selection processing even if the stroke speed is reduced to equal to or less than the speed $V_1$ afterward. In this case, when desiring the text selection, the user may once release the operation tool from the display surface and bring the operation tool in contact with the display surface again.

The operation control method by the operation control apparatus 100 according to the present embodiment has been described above. According to the present embodiment, in the case where the area of the contact area of the operation tool with the display surface is equal to or less than the predetermined size when the user drags the operation tool while keeping it in contact with the display surface or in the case where the stroke speed is greater than the speed $V_1$, the user can scroll the screen according to the drag operation until releasing the operation tool from the display surface. On the other hand, in the case where the stroke speed is equal to or less than the speed $V_1$, the text selection can be performed according to the trajectory of the drag operation. The operation corresponds to the operation (mouse event) of dragging a mouse connected to a personal computer generally while holding the left button down. If an application is notified of an appropriate mouse event, an arbitrary operation such as text selection or cell selection can be assigned to the mouse event at the application side.

In this manner, the text selection processing and the screen scroll processing at the time of the drag operation can be distinguished based on the stroke speed and the area of the contact area of the operation tool in the drag operation on the screen. The user can switch the text selection processing and the screen scroll processing only by the drag operation, without learning a new operation.

In addition, the size of the contact area is determined by the area of the contact area in the present embodiment, but the present invention is not limited to such example, and the size of the contact area may be judged by the length of the contact area in a predetermined direction. As a specific example, the length of the contact area in the vertical direction of the screen determined by the use state of the touch panel may be used as an index indicating the size of the contact area. As shown in FIG. 6, when the inner surface of the finger F is brought into contact with the display surface, the length t of the contact area 220 in the vertical direction of the screen is long. On the other hand, as shown in FIG. 7, when the tip of the finger F is brought into contact with the display surface, the length t of the contact area 220 in the vertical direction of the screen is short. By using such a change in the length t of the contact area, the operation determination unit 140 causes the text selection processing to be executed in the case where the length t is equal to or longer than a predetermined length and causes the screen scroll processing to be executed in the case where the length t is shorter than the predetermined length.

Moreover, the stroke speed of the operation tool used for the determination of the operation processing is the stroke speed calculated on an as-needed basis by the speed calculation unit 150 from the detection values continuously detected by the detection unit 114 at the step 150, but the present invention is not limited to such example. For example, the operation determination unit 140 may determine the operation processing based on the first speed at the time when the operation tool is brought into contact with the display surface and the drag operation is performed. Generally, the first speed of the stroke of the operation tool at the time of performing the screen scroll processing tends to be greater than the first speed of the stroke at the time of performing the text selection processing. Accordingly, it may be determined at the step S150 whether the first speed of the stroke is equal to or less than a predetermined speed.

Alternatively, the operation determination unit 140 may determine at the step S150 the operation processing based on the stroke acceleration instead of the stroke speed of the operation tool. Generally, the stroke acceleration of the operation tool at the time of performing the screen scroll tends to be greater than the stroke acceleration at the time of performing the text selection processing. Accordingly, it may be determined at the step S150 whether the stroke acceleration is equal to or less than a predetermined acceleration.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the embodiment described above, the text selection processing is executed in the case where the area of the contact area of the operation tool is equal to or greater than the predetermined size and the screen scroll processing is executed in the case where the area of the contact area is smaller than the predetermined size, but the present invention is not limited to such example. For example, the screen scroll processing may be caused to be executed in the case where the area of the contact area of the operation tool is equal to or greater than the predetermined size and the text selection processing may be caused to be executed in the case where the area of the contact area is smaller than the predetermined size. The operation processing to be associated according to the size of the contact area may be determined by considering the contact state of the operation tool in which the operation is easy to be performed.

Moreover, in the embodiment described above, the description is made taking as an example the screen 200 on which text is arranged on a Web page or on a scrollable page, for example, the operation control method by the operation control apparatus 100 according to the present embodiment can be applied to other examples. For example, in the case of bringing the operation tool in contact with the display/input unit 110 and drawing a figure, the operation control method by the operation control apparatus 100 can be used.

For example, in the case of drawing a figure or the like, the user places the tip of a finger into contact with the display unit and moves the finger. On the other hand, in the case where the input area of the figure or the like is greater than the display surface, the screen has to be scrolled in order to display the hidden input area. In this case, the user places the inner surface of a finger into contact with the display unit and moves the finger in a direction in which the user desires to scroll the screen. In this manner, the operation which the user is trying to perform in a drag of a finger in the same direction can be presumed by the size of the contact area of the finger, and the multiple operation processing is possible by an act.

The present application contains subject matter related to that disclosed in Japanese Priority Patent Application JP 2009-159147 filed in the Japan Patent Office on Jul. 3, 2009, the entire content of which is hereby incorporated by reference.

What is claimed is:

1. An operation control apparatus comprising:
a detection unit configured to detect contact of an operation tool with a display surface of a display unit;
a contact determination unit configured to determine a contact state of the operation tool with the display surface based at least in part on the detection result by the detection unit;
a contact area recognition unit configured to recognize, when the contact determination unit determines that the operation tool is in contact with the display surface, a contact area on which the operation tool contacts the display surface; and
an operation determination unit configured to determine, from a plurality of operation processing that are associated with an act of the operation tool in contact with the display surface, an operation processing to be executed, based at least in part on a size of the contact area recognized by the contact area recognition unit, the operation determination unit being configured to determine to execute scroll processing for scrolling a screen displayed on the display unit if the size of the contact area is less than a size threshold value and to determine to execute cursor movement processing for moving a cursor indicating a display position on the display unit if the size of the contact area is greater than the size threshold value.

2. The operation control apparatus according to claim 1, further comprising:
- a speed calculation unit configured to calculate a moving speed of the operation tool based on the detection result by the detection unit,
- wherein the operation control unit is configured to cause the cursor movement processing to be executed, even if the size of the contact area is smaller than the size threshold value, when the moving speed of the operation tool becomes greater than a predetermined speed.

3. The operation control apparatus according to claim 1, wherein the operation determination unit is configured to, when the scroll processing is to be executed, executes the scroll processing until the operation tool is released from the display surface.

4. The operation control apparatus according to claim 1, wherein the size of the contact area is an area of the contact area.

5. The operation control apparatus according to claim 1, wherein the size of the contact area is a length of the contact area in a predetermined direction.

6. An operation control method, comprising acts of:
- detecting contact of an operation tool with a display surface of a display unit;
- determining a contact state of the operation tool with the display surface based at least in part on the detection result;
- recognizing, when the operation tool is in contact with the display surface, a contact area on which the operation tool contacts the display surface; and
- determining, from a plurality of operation processing that are associated with an act of the operation tool in contact with the display surface, an operation processing to be executed, based at least in part on a size of the recognized contact area, the determining comprising determining to execute scroll processing for scrolling a screen displayed on the display unit if the size of the contact area is less than a size threshold value and determining to execute cursor movement processing for moving a cursor indicating a display position on the display unit if the size of the contact area is greater than the size threshold value.

7. At least one storage device having encoded thereon instructions which, when executed by a computer, perform a method for causing the computer to function as an operation control apparatus, the method comprising acts of:
- determining, based at least in part on a detection result by a detection unit for detecting contact of an operation tool with a display surface of a display unit, a contact state of the operation tool with the display surface;
- recognizing, when the operation tool is in contact with the display surface, a contact area on which the operation tool contacts the display surface; and
- determining, from a plurality of operation processing that are associated with an act of the operation tool in contact with the display surface, an operation processing to be executed, based at least in part on a size of the recognized contact area, the determining comprising determining to execute scroll processing for scrolling a screen displayed on the display unit if the size of the contact area is less than a size threshold value and determining to execute cursor movement processing for moving a cursor indicating a display position on the display unit if the size of the contact area is greater than the size threshold value.

\* \* \* \* \*